Patented June 5, 1945

2,377,752

UNITED STATES PATENT OFFICE 2,377,752

POLYMERIZATION METHOD

Joseph W. Britton and Robert C. Dosser, Midland, Mich., assignors to The Dow Chemical Company, Midland, Mich., a corporation of Michigan No Drawing. Application August 3, 1940,
Serial No. 351,220

5 Claims. (Cl. 260—88)

This invention concerns an improved method of polymerizing vinyl and vinylidene compounds, particularly vinyl halides, and also certain new complex catalysts which are exceptionally effective in promoting the polymerization of vinyl compounds.

It is known that the polymerization of a vinyl halide, either alone or in an inert medium, is catalyzed by the presence of peroxides or other per-oxygen compounds capable of supplying nascent oxygen. However, even under these conditions, the polymerization occurs sluggishly and long periods of time are required in order to obtain commercially practical yields of the polymer. Also the polymer obtained under such usual polymerizing conditions frequently possesses unsatisfactory molding properties or poor strength characteristics. Similar difficulties are encountered in polymerizing other vinyl compounds.

We have discovered that the polymerization of vinyl halides in the presence of per-oxygen compounds as catalysts may be further accelerated by having present a small proportion of a ferric, chromic, aluminum, or a uranium compound and that the polymerization rate may be increased even further by having also present sufficient acid to render the mixture distinctly acidic. The mixed catalysts thus prepared are far more effective than any one of their individual ingredients in promoting the polymerization of vinyl halides or various other vinyl compounds, thus indicating that the above named catalytic ingredients co-act as a unitary complex catalyst. Use of these complex catalysts in promoting the polymerization of vinyl halides permits the production of polymers which are of consistently good quality as regards their appearance, molding properties, and strength.

The polymerization of a vinyl halide, e. g., vinyl chloride or vinyl bromide, with the complex catalyst is carried out in a closed container or under other conditions which prevent the absorption of oxygen or air during the reaction, since absorbed molecular oxygen inhibits the reaction. The reaction mixture is prepared so as to contain the vinyl halide and the catalyst in intimate admixture with one another or co-dissolved in a mutual solvent. The polymerization may be carried out using water as a reaction medium by emulsifying the vinyl halide with an aqueous solution of the complex catalyst and an emulsifying agent, e. g., egg albumen, and alkali metal sulphonate of an aliphatic or an alkyl-aromatic hydrocarbon of high molecular weight, etc., and maintaining the emulsion at a polymerizing temperature. However, the polymerization occurs most smoothly and rapidly when carried out in the presence of mutual solvent for the vinyl halide and the catalyst. Methanol, ethanol, propanol, butanol, acetone, dioxane, etc., or aqueous solutions of such solvents may be used as the medium. The medium may be used in any desired proportion, provided that sufficient is employed to co-dissolve the catalyst and vinyl halide.

A solution of the vinyl halide and the complex catalyst may be prepared by admixing the various ingredients in any desired order. The per-oxygen compound used as an ingredient of the catalyst may be any peroxide or other per-oxygen compound capable of being brought in solution with the vinyl halide, e. g., it may be benzoyl peroxide, sodium or potassium perborate, sodium or potassium persulphate, hydrogen peroxide, or a metal peroxide such as sodium or barium peroxide which may be acidified to form hydrogen peroxide in situ. In most instances, hydrogen peroxide is preferred. The peroxide is usually employed in amount corresponding to between 0.1 and 10 per cent of the weight of the vinyl halide, but it may be used in other proportions if desired.

Examples of ferric, chromic, aluminum, or uranium compounds which may be employed as catalyst ingredients are the ferric, chromic, aluminum, and uranium nitrates, chlorides, sulphates, acetates, etc. The proportion of such metal compound is preferably small, e. g., a ferric compound is preferably used in amount such that its metal content corresponds to between 0.0001 and 0.03 per cent of the weight of the vinyl halide to be polymerized. The presence of a larger proportion of a ferric salt during polymerization of a vinyl halide interferes with the polymerization and may cause contamination of the polymer, but in polymerizing other vinyl compounds with the complex catalyst larger proportions of a ferric compound may in some instances be tolerated. A chromic, aluminum, or a uranium compound may be employed instead of the ferric compound, in similar proportions, but chromic, aluminum, and uranium compounds are most effective when used in somewhat larger proportions, e. g., in amounts such that their metal content corresponds to between 0.05 and 1 per cent of the weight of the vinyl compound. They may be used in larger proportions if desired. For instance, vinyl chloride may be polymerized with a complex catalyst containing chromic chloride in amount such that its chromium content corresponded to more than 2 per cent of the weight of the vinyl chloride. Two or more of the metal compounds just mentioned, e. g., a ferric compound and a chromic compound, may, of course, be used together in the complex catalyst.

Examples of acids which may be used as catalyst ingredients are nitric acid, hydrochloric acid, sulphuric acid, acetic acid, chloro-acetic acid, etc. Nitric acid is preferred. The acid is used in a proportion sufficient to render the entire reaction mixture acidic, e. g., to reduce its pH value to 6, or lower, and preferably to between 1.5 and 3.

The polymerization of a vinyl halide in the presence of the complex catalyst occurs exceptionally rapidly and completely at temperatures between -10° and 50° C. to form colorless thermoplastic polymers having good molding properties and good strength. Higher polymerizing temperatures may be employed, if desired. When operating at temperatures below 0° C., the polymerization reaction may be carried out at atmospheric pressure, but when operating at higher temperatures the reaction is carried out under pressure in a closed vessel. By using the complex catalyst to promote the polymerization, polymers of consistently good quality may be produced.

The following examples describe a number of ways in which the principle of the invention has been applied and demonstrate certain of the advantages of the invention, but they are not to be construed as limiting.

EXAMPLE 1

Several samples of vinyl chloride from a common source were each mixed with an equal weight of aqueous methanol of 85 per cent by weight concentration and with about 0.5 per cent by weight (based on the weight of the vinyl chloride) of a 30 per cent concentrated aqueous solution of hydrogen peroxide. Varying amounts of ferric chloride were added to the resultant mixtures, which were then heated in closed vessels to a constant temperature of 40° C. for the periods stated in the following table, after which each mixture was examined to determine the quantity of polymerized vinyl chloride therein. The table gives the proportion of ferric chloride in each mixture, expressed as per cent of the weight of vinyl chloride employed, and also states the per cent of the vinyl chloride which had undergone polymerization after maintaining each mixture at 40° C. for the period given.

Table I

| $FeCl_3$ | Percent of vinyl chloride polymerized in— | |
|---|---|---|
| | 6 hrs. | 17 hrs. |
| None | -------- | Less than 5 |
| 0.005 | 87.5 | 90 |
| 0.01 | 89 | 89 |
| 0.025 | 80 | 82.5 |
| 0.05 | 65 | 78 |
| 0.10 | -------- | 10–15 |
| 0.25 | -------- | Less than 5 |
| 0.50 | -------- | Less than 5 |

From the above table it will be seen that a mixture of hydrogen peroxide and ferric chloride in small proportion is far more effective than the peroxide alone in promoting the polymerization, but that when the ferric chloride is used in larger proportions, e. g., in amount corresponding to 0.25 per cent or more of the weight of the vinyl chloride, it inhibits the polymerization.

EXAMPLE 2

A mixture of 25 parts by weight of vinyl chloride, 75.5 parts of a dilute aqueous hydrogen peroxide solution (containing 75 parts of water and 0.5 part of hydrogen peroxide) and 2.5 parts of Nopco (a sodium salt of sulphonated sperm oil) were mixed and the mixture was agitated until emulsified. The emulsion was divided into 3 portions. One portion of the emulsion was treated with nitric acid in amount sufficient to reduce its pH value to 2, and another portion was treated with a like proportion of the acid and also with ferric chloride in amount corresponding to 0.004 per cent of the weight of the mixture. The three samples of the emulsion were then warmed in closed vessels at a temperature of 40° C. for 6 hours, 45 minutes, after which each sample was treated with ethanol to precipitate the polymerized vinyl chloride and the latter was separated, dried, and weighed. The following table states which of the catalyst ingredients, hydrogen peroxide, acid, and ferric chloride was present in the emulsion subjected to warming, and also gives each per cent of polymer, based on the amount of vinyl chloride employed.

Table II

| Run No. | Catalyst ingredients | Polymer per cent yield |
|---|---|---|
| 1 | $H_2O_2$ | Trace |
| 2 | $H_2O_2$—$HNO_3$ | 8 |
| 3 | $H_2O_2$—$HNO_3$—$FeCl_3$ | 45 |

EXAMPLE 3

The purpose of this example is to illustrate ways in which the complex catalyst may be modified and still obtain exceptional catalytic activity and also to describe the polymers obtained by polymerizing vinyl chloride using the various modifications of the catalyst. In each of a series of experiments, 10 grams of vinyl chloride was treated with an equal weight of 85 per cent concentrated aqueous methanol and with a complex catalyst containing the ingredients stated in the following table in the amounts also given. Each mixture was then warmed in a closed vessel to a temperature of 40° C. for a period of 24 hours, after which the polymerized vinyl chloride was separated, washed with water and dried. The yields of polymer, based on the vinyl chloride employed in the respective experiments are given in the table. The decomposition temperature of each polymer was determined by gradually heating a sample of the same until a temperature was reached at which it turned brown throughout. The viscosity characteristics of the polymers were studied by dissolving each polymer in 50 cubic centimeters of methyl n-amyl ketone at 20° C. and determining the viscosity of the solution in centipoises at said temperature. The decomposition points and viscosity characteristics so determined are given in Table III.

Table III

| Run No. | Catalyst | | | | | Polymer | | |
|---|---|---|---|---|---|---|---|---|
| | $H_2O_2$, gms. | Acid | | Metal compound | | Percent yield | Decomposition point, °C | Viscosity characteristic, millipoises |
| | | Kind | Gms. | Kind | Gms. | | | |
| 1 | 0.1 | HCl | 0.1 | $FeCl_3$ | 0.001 | 67 | 200 | 0.964 |
| 2 | 0.1 | $HNO_3$ | 0.1 | ...do... | 0.001 | 77.8 | 195 | 0.943 |
| 3 | 0.1 | ...do... | 0.1 | $Fe(NO_3)_3$ | 0.001 | 85.6 | 195 | 0.999 |
| 4 | 0.1 | ...do... | 0.1 | $Fe(SO_4)_3$ | 0.002 | 86.5 | 195 | 0.977 |
| 5 | 0.1 | Acetic acid | 0.1 | Basic ferric diacetate $FeOH(C_2H_3O_2)_2$ | 0.002 | 84.0 | 195 | 0.975 |
| 6 | 0.1 | $HNO_3$ | 0.1 | $U_2O_2(NO_3)_2 \cdot 6H_2O$ | 0.1 | 80.0 | 195 | 1.072 |
| 7 | 0.1 | ...do... | 0.1 | $CrCl_3 \cdot 6H_2O$ | 0.05 | 90.0 | 210 | 1.024 |
| 8 | 0.1 | ...do... | 0.1 | ...do... | 0.25 | 90.0 | 195 | 0.998 |
| 9 | 0.1 | ...do... | 0.1 | $AlCl_3 \cdot 6H_2O$ | 0.1 | 85.0 | 200 | 1.075 |
| 10 | 0.1 | ...do... | 0.1 | ...do... | 1.0 | 75.5 | 200 | 0.992 |

The new catalysts have been found to be exceptionally effective in promoting the polymerization of other polymerizable vinyl and vinylidene compounds, e. g., methyl methacrylate, methyl isopropenyl ketone, vinyl cyanide, asymmetric dichloro-ethylene, vinyl acetate, etc., although other operating conditions such as the type of reaction medium employed also influence the rate of polymerization. Applications of E. C. Britton et al., Serial Nos. 351,222; 351,223; 351,224; and 351,225, describing methods of polymerizing certain vinyl or vinylidene compounds in the presence of the new catalysts are filed concurrently herewith. The application, Serial No. 351,222, discloses and claims the copolymerization of two or more different vinyl and vinylidene compounds in the presence of the complex catalyst. Application, Serial No. 351,223, claims the polymerization in aqueous emulsion and in the presence of the complex catalyst of certain vinyl and vinylidene compounds other than vinyl halides. Application, Serial No. 351,224, claims the copolymerization of a vinyl halide and a vinylidene halide while in an aqueous emulsion containing the complex catalyst. Application, Serial No. 351,225, discloses and claims the polymerization of certain vinyl and vinylidene compounds, other than vinyl halides while dissolved in an inert solvent containing the complex catalyst.

Applications Serial Nos. 351,223; 351,224; and 351,225, issued as Patents Nos. 2,333,633; 2,333,634; and 2,333,635, respectively, on November 9, 1943.

Other modes of applying the principle of the invention may be employed instead of those explained, change being made as regards the method or catalysts herein disclosed, provided the steps or ingredients stated by any of the following claims or the equivalent of such stated steps or ingredients be employed.

We therefore particularly point out and distinctly claim as our invention:

1. The method which comprises dissolving a vinyl halide and a catalyst comprising an acid, a peroxide, and a ferric compound in a mutual solvent, the acid being employed in amount sufficient to reduce the pH value of the reaction mixture to below 6 and the ferric compound being employed in a proportion such that its iron content does not exceed 0.03 per cent of the weight of the vinyl halide, and polymerizing the vinyl halide in the presence of said catalyst and solvent.

2. The method which comprises dissolving vinyl chloride, an acid, a peroxide, and a ferric compound in a mutual solvent, the ferric compound being employed in a proportion such that its iron content does not exceed 0.03 per cent of the weight of the vinyl chloride and the acid being employed in amount sufficient to reduce the pH value of the mixture to between 1.5 and 3, and polymerizing the vinyl chloride while in said mixture.

3. The method which comprises dissolving vinyl chloride, an acid, a peroxide, and a ferric compound in a mutual solvent, the ferric compound being employed in a proportion such that its iron content does not exceed 0.03 per cent of the weight of the vinyl chloride and the acid being employed in amount sufficient to reduce the pH value of the mixture to between 1.5 and 3, and polymerizing the vinyl chloride while in said mixture.

4. The method which comprises dissolving vinyl chloride, nitric acid, hydrogen peroxide, and a ferric compound in a mutual solvent, the ferric compound being employed in a proportion such that its iron content does not exceed 0.03 per cent of the weight of the vinyl chloride and the acid being employed in amount sufficient to reduce the pH value of the mixture to between 1.5 and 3, and polymerizing the vinyl chloride while in said mixture.

5. In a method wherein a vinyl halide is polymerized to form a poly-vinyl halide, the steps of forming a substantially uniform mixture comprising a vinyl halide, an acid, a peroxide, a ferric compound, and a liquid medium selected from the class consisting of water and mutual solvents for the other ingredients just mentioned, the acid being present in amount sufficient to reduce the pH value of the mixture to below 6 and the ferric compound being present in amount such that its iron content does not exceed 0.03 per cent of the weight of the vinyl halide, and polymerizing the latter while in the mixture.

JOSEPH W. BRITTON.
ROBERT C. DOSSER.